Figure 5:
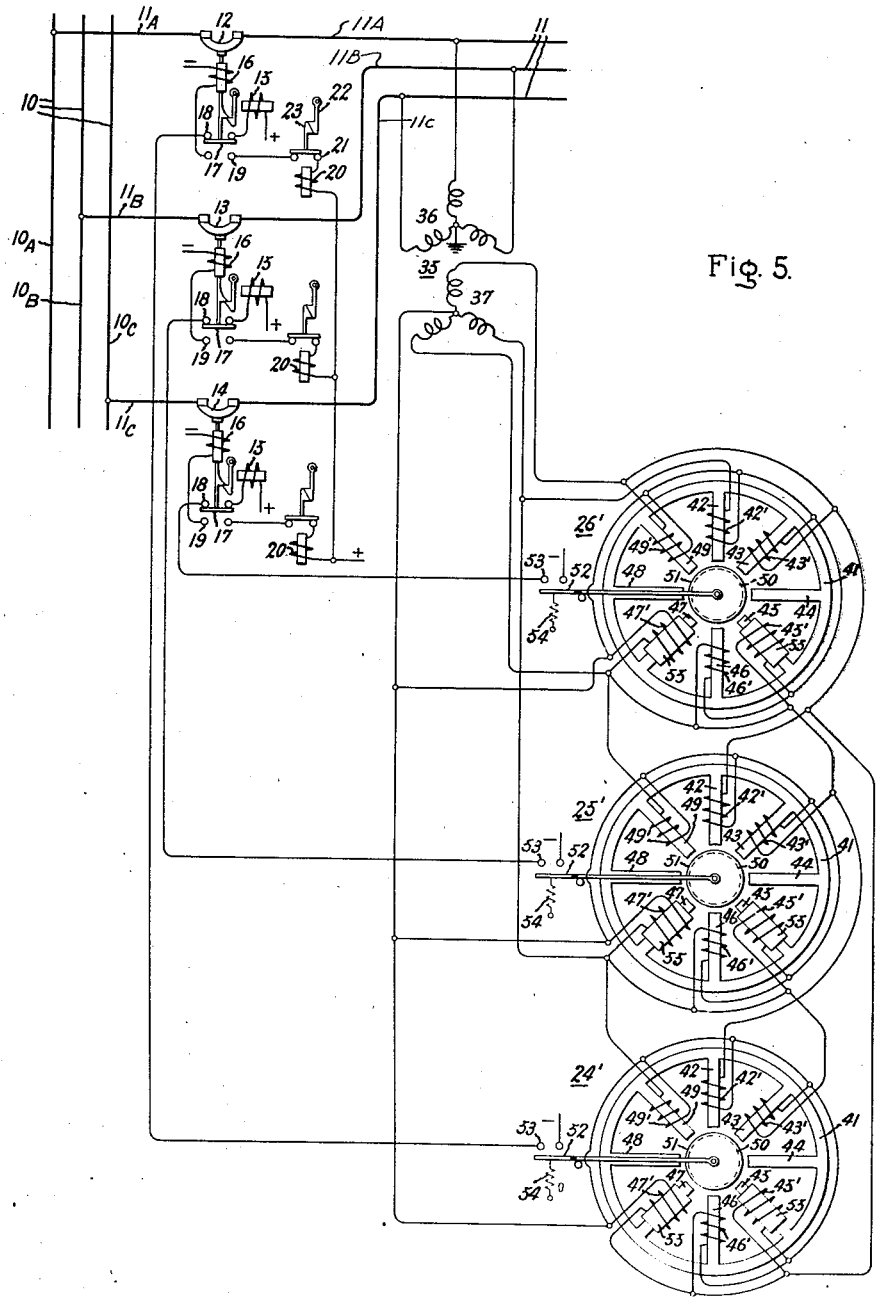

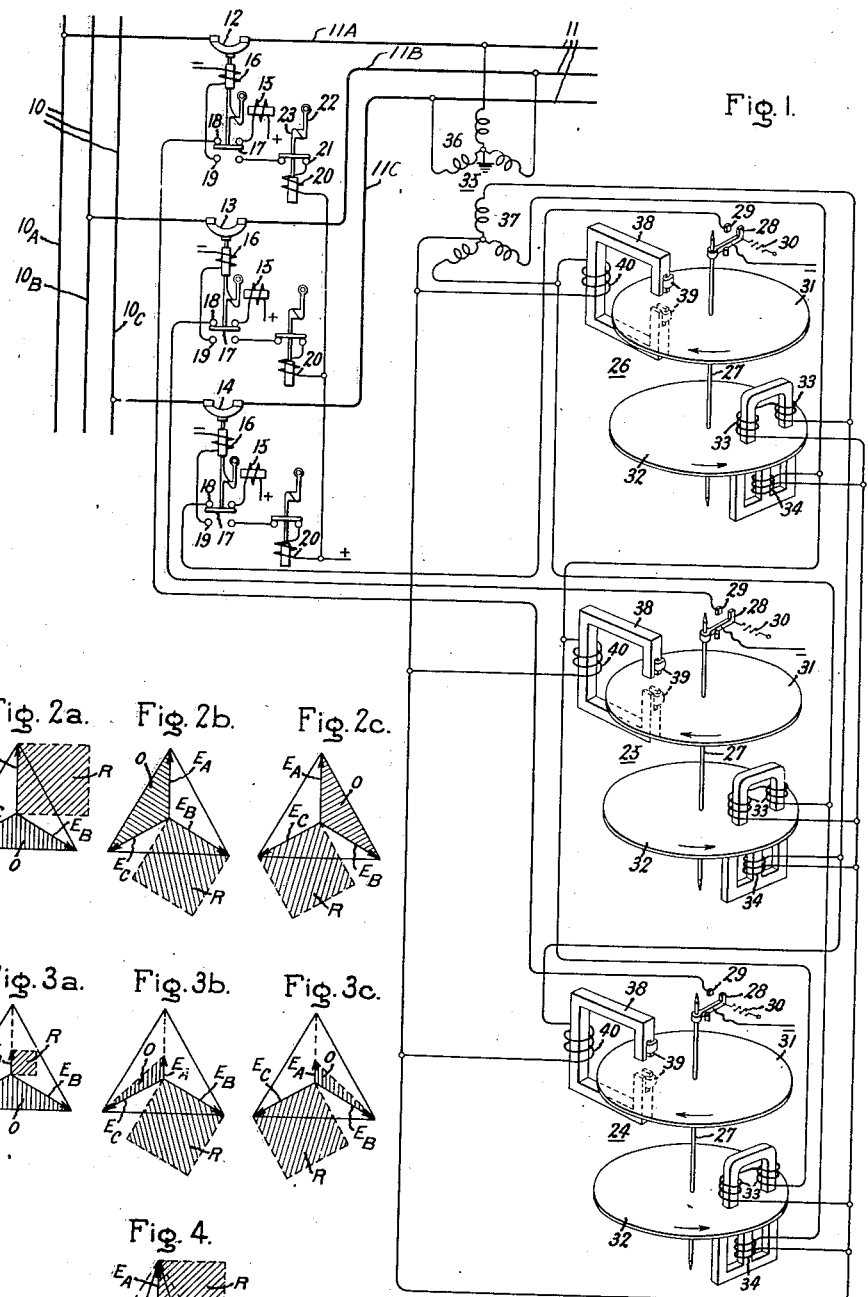

Patented Dec. 12, 1944

2,365,025

UNITED STATES PATENT OFFICE 2,365,025

PROTECTIVE SYSTEM

Oliver C. Traver, Drexel Hill, Pa., and Andrew J. McConnell, Albany, N. Y., assignors to General Electric Company, a corporation of New York Application February 11, 1943, Serial No. 475,492

13 Claims. (Cl. 175—294)

Our invention relates generally to protective systems and in particular to protective systems for polyphase alternating current circuits employing reclosing single pole circuit breakers. Specifically our invention is concerned with electroresponsive devices for selecting the faulted phase for proper operation of the single pole circuit breakers for single phase switching.

In the operation of polyphase alternating current systems and particularly systems supplying power to synchronous machinery, it has been found desirable in certain cases to deenergize only the faulted conductor when a ground fault occurs, thus leaving the remaining conductors energized to maintain synchronism of the connected machinery. The deenergized faulted conductor is re-energized upon clearing of the fault.

It is an object of our invention to provide a new and improved protective system for a polyphase alternating current circuit which will function to deenergize only the conductor upon which a ground fault occurs when such a ground fault is present on the circuit.

It is another object of our invention to provide a new and improved selector relay capable of quickly and correctly indicating which of several phase conductors has become grounded.

It is a further object of our invention to provide a new and improved selector relay for a protective system embodying single phase switching quickly and correctly to deenergize only the faulted conductor of the polyphase circuit.

Further objects and advantages of our invention will become apparent as the following description proceeds and the features of novelty which characterize our invention will be pointed out with particularity in the claims annexed to and forming a part of this specification.

For a better understanding of our invention, reference may be had to the accompanying drawings in which Fig. 1 illustrates diagrammatically an embodiment of our invention as applied to a polyphase alternating current circuit, Figs. 2a, 2b, 2c, 3a, 3b, 3c and 4 are vector diagrams to aid in understanding the operation of the protective system of Fig. 1, and Fig. 5 diagrammatically illustrates a modification of the invention illustrated in Fig. 1.

Referring now to Fig. 1 of the drawings, we have illustrated our invention in connection with a polyphase alternating current system specifically illustrated as comprising a three-phase circuit 10 including phase conductors 10a, 10b, and 10c respectively. Connected to circuit 10 we have illustrated the protected three-phase alternating current circuit 11 as comprising phase conductors 11a, 11b and 11c which are respectively connected to phase conductors 10a, 10b and 10c of circuit 10 through single pole circuit interrupters 12, 13 and 14. Each of the circuit interrupters 12, 13, and 14 is adapted for single pole switching and is schematically illustrated as a latched closed circuit breaker having a trip coil 15, a reclosing coil 16 and an auxiliary switch 17 which is adapted to bridge "a" contacts 18, which are closed when the circuit breaker is closed and "b" contacts 19 which are closed when the circuit breaker is open.

Since our invention is primarily concerned with electroresponsive devices or selector relays which will cause operation of the proper circuit breaker 12, 13, or 14 upon the occurrence of a single line to ground fault on one of the conductors of circuit 11, we have simplified the disclosure in regard to the reclosing control circuits by illustrating them as designed to permit one opening and reclosing of the circuit breakers so that any subsequent opening thereof will cause the circuit breaker to lock out. It will be obvious to those skilled in the art that any of the well known control circuits for the circuit breakers 12, 13 and 14 may be provided. For example, a control circuit may be provided whereby the circuit breakers 12, 13 or 14 upon the occurence of a line to ground fault, will open and reclose a plurality of times say, for example, three times, after which the circuit breaker will lock out. This is based upon the assumption that if a plurality of successive openings of the reclosing circuit breaker does not clear a fault, a permanent fault is indicated. In addition, it will also be understood by those skilled in the art that a fault involving more than one phase conductor may be permitted to cause simultaneous operation of all of the circuit breakers. In Fig. 1, however, we have merely illustrated each circuit breaker as provided with a lockout relay 20 having normally closed contacts 21. Whenever any one of the circuit breakers 12, 13 or 14 opens, the corresponding switch 17 closes "b" contacts 19 to energize lockout relay 20. However, simultaneously with the energization of lockout relay 20, the corresponding reclosing coil 16 is energized to initiate immediate reclosure of the single pole breaker which has been opened. It will be understood that lockout relay 20 must delay opening its contacts 21 until the controlled circuit breaker is latched closed. When lockout relay 20 has been operated, a latch 22 will engage a cooperating hook-shaped member 23 so that subsequent openings of the circuit breaker after the first opening, will not permit reclosing of the breaker which will remain locked out. As illustrated schematically in the drawings, the lockout relay 20 must be manually reset, but it will be obvious to those skilled in the art that automatic resetting means could be provided which caused resetting thereof after a predetermined time delay. Also if a plurality of openings and reclosures of the circuit breaker are desired prior to lockout thereof, this may be accomplished by the well-known form of notching relay so often employed in reclosing circuit breaker control systems.

We have discovered that many of the well-known electroresponsive devices such as impedance relays, current relays, voltage relays and the like, do not operate satisfactorily to correctly pick out the faulted conductor and cause operation of the single pole circuit breaker to de-energize such conductor under all conditions. We have discovered, however, that an electroresponsive device which is energized from the protected circuit in such a manner as to be responsive to a controlling influence tending to cause the electroresponsive device to operate in response to a torque proportional to the area of the triangle determined by two vectors having a common origin representing two voltage quantities of said protected circuit and the tendency to operate is opposed by a restraining torque proportional to a function of another voltage quantity of said circuit the correct circuit breaker is operated under all single line to ground fault conditions. Under double line to ground fault conditions, the unfaulted conductor is not deenergized if that is desirable.

Accordingly, we have illustrated a plurality of electroresponsive devices designated generally as 24, 25 and 26 which control the operation of circuit breakers 12, 13 and 14 respectively. Since these electroresponsive devices 24, 25 and 26 are identical, only one of them will be described hereinafter and the corresponding parts of all of them will be designated by the same reference numerals.

Electroresponsive devices 24, 25 and 26 may be any of the well-known types of relays as far as general structure is concerned, which have a movable member to which a plurality of torques are applied. For example, it may be of the induction disk type of relay illustrated in Fig. 1. As will be understood by those skilled in the art, the operating and restraining torques applied to the movable member of an induction disk type of relay, may be applied to a single disk, or as illustrated in Fig. 1, may be applied to separate disks mounted on a common shaft. Accordingly in Fig. 1, each of the electroresponsive devices 24, 25 and 26 is illustrated as comprising a rotatable shaft 27 which in turn controls a movable contact controlling member 28 adapted to engage a contact 29. Contact 29 and contact controlling member 28 are connected in series with the trip coil 15 of the associated single pole circuit breaker and the "a" switch contacts 18 which comprise the trip circuit of that circuit breaker. A suitable spring 30 may constantly bias rotatable shaft 27 in such a direction as to move control member 28 away from contact 29 or, in other words, tend to maintain the trip circuit in the open condition.

In order to apply torques to rotatable shafts 27 of electroresponsive devices 24, 25 and 26, we have provided each of the shafts 27 with a plurality of disks 31 and 32 rigidly attached thereto. An operating torque for causing contact 29 to be engaged by contact controlling member 28 in response to a predetermined torque condition on circuit 11 is obtained by means of an operating circuit which controls the energization of a motor element comprising a magnetic structure of the well known wattmeter type having windings 33 and 34 arranged so as to produce a torque on disk 32 proportional to the area of the triangle determined by two predetermined voltage vectors of circuit 11 having a common origin. It will be obvious to those skilled in the art that a torque proportional to the area of a triangle may be obtained from a wattmetric element energized by two electrical quantities which may be vectorially represented by two vectors having a common origin which torque will be equal to the product of these two vector quantities multiplied by the sine of the angle between them, or in other words proportional to the area of the triangle determined by said vector quantities having a common origin.

We have discovered that if the motor element associated with disk 32 of each of the electroresponsive devices 24, 25 and 26 are energized with the line to neutral voltage quantities of circuit 11 when combined with the restraining torque motor element to be described hereinafter that proper operation thereof will result. Accordingly we provide potential transformer 35 having a Y-connected primary winding 36 connected to circuit 11. Potential transformer 35 is also provided with a Y-connected secondary winding 37 for energizing electroresponsive devices 24, 25 and 26. The windings 33 of electroresponsive device 26 and the winding 34 of electroresponsive device 25 are energized with a potential proportional to the line to neutral potential of phase conductor 11A, while the winding 34 of electroresponsive device 26 and the windings 33 of electroresponsive device 24 are energized with a potential proportional to the line to neutral potential of phase conductor 11B. Also the windings 33 of electroresponsive device 25 and the winding 34 of electroresponsive device 24 are energized with a potential proportional to the line to neutral potential of phase conductor 11c. With this arrangement electroresponsive device 24 under normal unfaulted conditions has an operating torque impressed thereon in a direction indicated by the arrow on disk 32 proportional to the shaded area O of Fig. 2a. Similarly electroresponsive device 25 has an operating torque impressed on disk 32 proportional to the shaded area O of Fig. 2b, and the electroresponsive device 26 has an operating torque impressed on disk 32 proportional to the shaded area O of Fig. 2c.

In order to prevent undesirable operation of electroresponsive devices 24, 25 and 26 we provide means for impressing on movable element 27 a restraining torque and we have found that if this restraining torque is made proportional to the square of the line to neutral voltage of the conductor which the particular electroresponsive device is designed to deenergize, that correct single pole switching operation may be obtained. Accordingly, each of the electroresponsive devices 24, 25 and 26 is provided with a motor element comprising a magnetic structure 38 including a pair of shaded poles 39 disposed in spaced relationship to form an air gap therebetween within which induction disk 31 is adapted to move. Magnetic structure 38 is provided with a winding 40 which is energized with a potential proportional to the line to neutral potential of the phase conductor the energization or deenergization of which the particular electroresponsive device is designed to control. Accordingly, winding 40 of electroresponsive device 24 is energized with a potential proportional to the line to neutral potential of phase conductor 11A, so as to produce a torque in the direction of the arrow indicated on disk 31 proportional to the square of the line to neutral voltage. This restraining torque is indicated by the area R in Fig. 2a. It will be obvious that a fault occurring on conductor 11A will cause a great reduction in this voltage with consequent reduction in restraining torque. Similarly winding 40 of electroresponsive device 25 is energized with a potential proportional to the line to neutral potential of phase conductor 11B so as to produce a restraining torque under normal conditions indicated by the area R in Fig. 2b, and the winding 40 of electroresponsive device 26 is energized with a potential proportional to the line to neutral potential of phase conductor 11c so as to produce a torque under normal conditions proportional to the area R of Fig. 2c.

The operation of the protective system illustrated in Fig. 1 will be obvious to those skilled in the art in view of the detailed description included above. Under normal unfaulted conditions of protected circuit 11, the operating and restraining torques applied to electroresponsive devices 24, 25 and 26 are respectively represented by the shaded areas O and R of Figs. 2a, 2b, and 2c. These torques will be so proportioned that operation of the electroresponsive devices will be prevented. In order that transients will not cause undesirable operation of the electroresponsive devices the restraining torque will be caused to predominate by a predetermined amount under such normal unfaulted conditions indicated in Figs. 2a, 2b, and 2c. In the event of a single line to ground fault on phase conductor 11A, the line to neutral voltage of phase conductor 11A will be reduced to a value dependent in part upon the distance from the fault to potential transformer 35 which may be represented by the voltage vector $E_A$ of Figs. 3a, 3b and 3c, while the line to neutral voltage $E_B$ and $E_C$ of phase conductors 11B and 11c will remain substantially unchanged. It will be obvious under these conditions that the restraining torque impressed on electroresponsive device 24 is greatly reduced while the operating torque remains substantially the same as indicated in Fig. 3a, whereupon contact controlling member 28 engages contact 29 to energize trip coil 15 of circuit breaker 12 associated with phase conductor 11A. The circuit of reclosing circuit breaker 12 is so arranged that upon opening thereof, "b" switch 17 is closed so as to energize reclosing coil 16 and cause subsequent reenergiaztion of phase conductor 11A. If the fault was temporary and has been cleared by such opening of circuit breaker 12 the circuit will remain energized and continue to operate in the normal manner. If, on the other hand, the fault was permanent, circuit breaker 12 would reopen and due to operation of lockout relay 20 would not reclose again.

Fig. 3b represents the torque conditions of electroresponsive device 25 when a single line to ground fault exists on phase conductor 11A. It will be observed that under these conditions the restraining torque represented by the area R far exceeds the operating torque represented by the area O and consequently electroresponsive device 25 properly will not operate to deenergize phase conductor 11B. Fig. 3c indicates the torque conditions on electroresponsive device 26 which controls the energization of phase conductor 11c. It will be observed that in this case also the restraining torque is relatively large to prevent deenergization of phase conductor 11c. In the event of a single line to ground fault on phase conductors 11B or 11c similar vector diagrams could be drawn illustrating the torque relationships for each of the electroresponsive devices 24, 25 and 26.

In the event of a double line to ground fault on phase conductors 11B and 11c we have illustrated the line to neutral voltage conditions which might exist on circuit 11. These voltages have been represented as $E_A$, $E_B$ and $E_C$ respectively in Fig. 4. The torque conditions on electroresponsive device 24 which controls the energization of the unfaulted conductor 11A under such a double line to ground fault is illustrated in Fig. 4. It is obvious from Fig. 4 that the selector relays of our invention comprising electroresponsive devices 24, 25 and 26 will not cause deenergization of the unfaulted phase conductor of the three-phase circuit 11 under a double line to ground fault. If desired, any suitable means may be provided for causing deenergization of all three phase conductors of circuit 11 in the event of a fault involving more than one conductor.

In Fig. 5 we have illustrated a protective system similar to Fig. 1 with the corresponding parts designated by the same reference numerals. However, in Fig. 5 the selector relays have been illustrated as of the induction cup type designated respectively as 24', 25' and 26'. Each of the electroresponsive devices 24', 25' and 26' are similar in construction to the electroresponsive device disclosed and claimed in United States Reissue Patent 21,813—Verrall, assigned to the same assignee as the present invention.

As shown in Fig. 5 each of these electroresponsive devices comprises a hollow magnetic stator 41 having a plurality of inwardly projecting salients 42 to 49 inclusive. Each of the salients except 44 and 48 is provided with a winding designated by the corresponding reference numeral marked with a prime.

The energization of the respective windings 42', 43', 45', 46', 47', and 49' of each of the electroresponsive devices 24', 25' and 26' is tabulated below, where the subscript after the letter E designates the particular line to neutral voltage involved.

| Windings | Energizing potential | | |
|---|---|---|---|
| | Relay 24' | Relay 25' | Relay 26' |
| 42' | $+E_C$ | $+E_A$ | $+E_B$ |
| 43' | $-E_B$ | $-E_C$ | $-E_A$ |
| 45' | $-E_A$ | $-E_B$ | $-E_C$ |
| 46' | $-E_A$ | $-E_B$ | $-E_C$ |
| 47' | $+E_A$ | $+E_B$ | $+E_C$ |
| 49' | $+E_B$ | $+E_C$ | $+E_A$ |

The structural details of the electroresponsive devices 24', 25' and 26' are clearly disclosed in the above-mentioned reissue patent and form no part of this invention, so a detailed description thereof will not be included herein these relays being only schematically shown. The windings 42', 43' 45', 46', 47' and 49' energize the corresponding salients 42, 43, 45, 46, 47 and 49, and also a central magnetic member 50 concentrically positioned with respect to the ends of the salients, thereby to actuate a cup-shaped rotor 51 which is movable in the gap between the salients and the stator 50. Each of the rotors 51 of electroresponsive devices 24', 25' and 26' are connected to a contact controlling member 52 adapted to bridge contacts 53 for controlling the energization of the trip circuits of the associated circuit breakers 12, 13 and 14 respectively. A suitable spring 54 is provided for each electroresponsive device to bias the contact controlling member 52 to the open circuit position.

The windings 42', 43' and 49' are energized to produce an operating torque proportional to the area of the voltage triangle determined by two line to neutral voltage vectors having a common origin. For example, referring to electroresponsive device 24', the winding 42' is energized with the line to neutral potential Ec while the windings 43' and 49' are energized with the potential EB, namely the line to neutral potentials of the phase conductors 11c and 11B respectively. The energization of winding 43' is negative with respect to the energization of winding 49' so that the interaction of the fluxes will produce twice the torque that might otherwise be produced if either winding 49' or 43' were eliminated. It will be obvious that the operating torque produced on rotor 51 of electroresponsive device 24' will be proportional to $E_B E_C \sin \theta$ where $\theta$ is the angle between the voltage vectors $E_B$ and $E_C$ or in other words proportional to the area O in Fig. 2a.

The salients 45, 46 and 47 and their associated windings when energized, produce a restraining torque on rotor 51. These salients are all energized with the same line to neutral potential, except for sign, for each particular electroresponsive device 24', 25', or 26'. Accordingly, in order to produce a torque, two of the salients, namely 45 and 47 are provided with copper sleeves 55 around which the respective windings are wound and which copper sleeves function like shading coils. These copper sleeves cause the air gap flux to lag, the total flux including the leakage flux, thereby producing the desired phase shift necessary to produce the respective restraining torque on rotor 51. Insofar as electroresponsive device 24' is concerned, the restraining torque will be proportional to $(E_A)^2$. It will be observed that the electroresponsive devices of Fig. 5 function in exactly the same manner as electroresponsive devices of Fig. 1 and consequently in view of the detailed description given above the operation of the arrangement in Fig. 5 will be obvious to those skilled in the art and no further discussion of such operation will be included herein.

While we have described particular embodiments of our invention, it will be obvious to those skilled in the art that various changes and modifications may be made without departing from our invention and we therefore aim in the appended claims to cover all such changes and modifications as fall within the true spirit and scope of our invention.

What we claim as new and desire to secure by Letters Patent of the United States is:

1. In a polyphase circuit having a single pole circuit breaker in series with each phase conductor of said circuit, means for effecting the opening of each breaker in response to a ground fault involving only the associated phase conductor comprising an electroresponsive device for each phase conductor of said circuit, each including a movable element, means for energizing each of said electroresponsive devices from said circuit so as to produce a torque on said movable element substantially proportional to the area of the triangle determined by two vectors having a common origin representing two predetermined voltage quantities of said circuit, and an opposing torque substantially proportional to a function of a voltage quantity of said circuit, so that only the circuit breaker associated with the faulted conductor is operated.

2. In a polyphase circuit having a single pole circuit breaker in series with each phase conductor of said circuit, means for effecting the opening of each breaker in response to a ground fault involving only the associated phase conductor comprising an electroresponsive device for each phase conductor of said circuit, each including a movable element, means for energizing said electroresponsive device from said circuit so as to produce a torque on said movable element substantially proportional to the area of the triangle determined by two vectors having a common origin representing two predetermined voltage quantities of said circuit, and an opposing torque substantially proportional to a function of another voltage quantity of said circuit so that only the circuit breaker associated with the faulted conductor is operated.

3. In a polyphase circuit provided with single pole reclosing circuit interrupting means so that only the faulted phase conductor may be deenergized upon the occurrence of a ground fault involving only a single phase conductor, means for selecting the faulted phase conductor comprising an electroresponsive device having a movable element, and means energized from said circuit for producing a torque on said movable element substantially proportional to the area of the triangle determined by two vectors having a common origin representing two predetermined voltage quantities of said circuit, and an opposing torque substantially proportional to a function of a voltage quantity of said circuit.

4. In a polyphase circuit having a single pole circuit breaker in series with each phase conductor of said circuit, means for effecting the opening of each breaker in response to a ground fault involving only the associated phase conductor comprising an electroresponsive device for each phase conductor of said circuit, each including a movable element, means for energizing each of said electroresponsive devices from said circuit so as to produce a torque on said movable element substantially proportional to the area of the triangle determined by two predetermined line to ground voltage quantities of said circuit which may be represented by two vectors having a common origin, and an opposing torque substantially proportional to a function of another line to ground voltage quantity of said circuit so that only the circuit breaker associated with the faulted conductor is operated.

5. In a polyphase circuit provided with single pole reclosing circuit interrupting means so that only the faulted phase conductor may be deenergized upon the occurrence of a ground fault involving only a single phase conductor, means for selecting the faulted phase conductor comprising an electroresponsive device having a movable element, and means energized from said circuit for producing a torque on said movable element substantially proportional to the area of the triangle determined by two vectors having a common origin representing two predetermined line to ground voltage quantities of said circuit, and an opposing torque substantially proportional to a function of another line to ground voltage quantity of said circuit.

6. In a polyphase circuit provided with single pole reclosing circuit interrupting means so that only the faulted phase conductor may be deenergized upon the occurrence of a ground fault involving only a single phase conductor, means for selecting the faulted phase conductor comprising an electroresponsive device having a movable element, and means energized from said circuit for producing an operating torque on said movable element substantially proportional to the area of the triangle determined by two vectors having a common origin representing the two line to ground voltage quantities of said circuit not effected by the fault involving but a single phase conductor and an opposing torque substantially proportional to a function of the line to ground voltage quantity of the faulted conductor of said circuit.

7. A phase selecting relay for a polyphase circuit responsive to a ground fault involving only a particular phase conductor of said circuit, comprising an electroresponsive device operable in response to a controlling influence proportional to the difference between a function of two voltages of said circuit and a function of a third voltage of said circuit.

8. A phase selecting relay for a polyphase circuit responsive to a ground fault involving only a particular phase conductor of said circuit, comprising an electroresponsive device operable in response to a controlling influence proportional to a function of two line to ground voltages of said circuit and a function of a third line to ground voltage of said circuit.

9. A phase selecting relay for a polyphase circuit responsive to a ground fault involving only a particular phase conductor of said circuit, comprising an electroresponsive device operable in response to a controlling influence proportional to a function of two line to ground voltages of said circuit which operation is opposed by a controlling influence proportional to a third line to ground voltage of said circuit.

10. A phase selecting relay for a polyphase circuit responsive to a ground fault involving only a particular phase conductor of said circuit, comprising an electroresponsive device operable in response to a controlling influence proportional to the area of the triangle determined by two vectors having a common origin representing two predetermined voltage quantities of said circuit, the operation of said electroresponsive device being opposed by another controlling influence substantially proportional to a function of a voltage quantity of said circuit.

11. A phase selecting relay for a polyphase circuit responsive to a ground fault involving only a particular phase conductor of said circuit, comprising an electroresponsive device operable in response to one controlling influence proportional to the area of the triangle determined by two vectors having a common origin representing two line to ground voltage quantities of said circuit, the operation of said electroresponsive device being opposed by another controlling influence substantially proportional to a function of a third line to ground voltage quantity of said circuit.

12. A relay responsive to a ground fault involving only a particular phase conductor of a polyphase circuit comprising means for producing a controlling effort proportional to a predetermined function of the product of the voltage between two other phase conductors of said circuit and ground and means for producing an opposing effect proportional to a function of the voltage between said particular phase conductor and ground.

13. In a polyphase circuit having a single pole circuit breaker in series with each phase conductor of said circuit, means for effecting the opening of one of said breakers in response to a ground fault involving only a particular phase conductor comprising an electroresponsive device including means for producing a control effect proportional to a predetermined function of the product of the voltage between two other phase conductors of said circuit and ground and means for producing an opposing effect proportional to a function of the voltage between said particular phase conductor and ground.

OLIVER C. TRAVER.
ANDREW J. McCONNELL.